United States Patent
Zamzow

(10) Patent No.: US 11,389,910 B2
(45) Date of Patent: Jul. 19, 2022

(54) POWER AND FREE CONVEYOR AND METHOD

(71) Applicant: Michael Zamzow, Weatherford, TX (US)

(72) Inventor: Michael Zamzow, Weatherford, TX (US)

(73) Assignee: Innovative Capital Solutions, LLC, Weatherford, TX (US)

( * ) Notice: Subject to any disclaimer, the term of this patent is extended or adjusted under 35 U.S.C. 154(b) by 0 days.

(21) Appl. No.: 17/126,845

(22) Filed: Dec. 18, 2020

(65) Prior Publication Data

US 2022/0193836 A1 Jun. 23, 2022

(51) Int. Cl.
| | |
|---|---|
| *B23P 6/00* | (2006.01) |
| *B65G 17/30* | (2006.01) |
| *B65G 19/02* | (2006.01) |
| *B65G 21/10* | (2006.01) |
| *B65G 17/20* | (2006.01) |
| *B61B 10/02* | (2006.01) |
| *B61B 10/00* | (2006.01) |

(52) U.S. Cl.
CPC .............. *B23P 6/00* (2013.01); *B61B 10/025* (2013.01); *B65G 17/20* (2013.01); *B65G 17/30* (2013.01); *B65G 19/025* (2013.01); *B65G 21/10* (2013.01); *B61B 10/00* (2013.01)

(58) Field of Classification Search
CPC ......... B23P 6/00; B65G 17/30; B65G 19/025; B65G 21/10; B61B 10/00; B61B 10/025
See application file for complete search history.

(56) References Cited

U.S. PATENT DOCUMENTS

| | | | | |
|---|---|---|---|---|
| 1,785,315 | A | | 12/1930 | Kennedy |
| 1,875,535 | A | | 9/1932 | Whitney |
| 2,928,356 | A | | 3/1960 | Tredwell |
| 3,523,504 | A | * | 8/1970 | Jones ................. B61B 10/025 104/178 |
| 3,559,585 | A | * | 2/1971 | Lempio ............. B61B 10/025 104/172.4 |
| 3,667,399 | A | * | 6/1972 | Czarnecki ......... B61B 10/025 104/172.4 |
| 3,973,504 | A | * | 8/1976 | Knudsen ............ B61B 10/02 211/162 |

(Continued)

FOREIGN PATENT DOCUMENTS

| | | |
|---|---|---|
| EP | 1568627 | 8/2007 |
| GB | 2457984 | 9/2009 |

*Primary Examiner* — Mark A Deuble
(74) *Attorney, Agent, or Firm* — Brian K. Yost; Decker Jones, PC

(57) ABSTRACT

An assembly for use with a power and free conveyor comprises a track member adapted to be slidingly received by a receiver portion of a power and free conveyor power track. The track member is slidingly moveable from a first position to a second position such that, when in the first position, the proximal end is retained within the receiver portion and the distal end is proximate to a connection portion. When in the second position, the proximal end is retained within the receiver portion and there is a gap between the distal end and the connection portion. A power and free conveyor comprising the assembly is also provided. A method of servicing a power and free conveyor comprising a sliding track member is also provided.

12 Claims, 3 Drawing Sheets

(56) References Cited

U.S. PATENT DOCUMENTS

| | | | | | |
|---|---|---|---|---|---|
| 5,400,717 | A | * | 3/1995 | Hoehn | B61B 10/025 104/94 |
| 5,570,639 | A | * | 11/1996 | Hooper | B61B 10/02 188/62 |
| 6,367,612 | B1 | * | 4/2002 | Dosso | B61B 10/025 198/731 |
| 6,487,976 | B1 | * | 12/2002 | Robison | B61B 10/025 198/370.02 |
| 11,040,730 | B2 | * | 6/2021 | Andreae | B65G 19/025 |

* cited by examiner

POWER AND FREE CONVEYOR AND METHOD

BACKGROUND OF THE INVENTION

1. Field of the Invention

The present invention relates generally to a conveyor and specifically to a power and free conveyor comprising a telescopically slidable portion of track and a method that permits simple servicing or replacement of the chain.

2. Description of the Prior Art

Power and free conveyors are used in manufacturing environments to transport parts, materials, and products, often overhead, from one position in the factory to another along tracks proximate to an assembly line. Such systems can handle loads of many different sizes ranging from a few pounds to many tons. Conventional power and free conveyors comprise a powered upper "power" track and an unpowered lower "free" track. The upper track and lower track are coupled together with horseshoe shaped connectors.

Power and free conveyors can be standard, wherein the upper track is the power track and the lower track is the free track. Power and free conveyors can also be inverted, wherein the power track is the lower track and the free track is the upper track. Whether standard or inverted, the power track comprises the chain driven by the motor which supplies the power.

The power track comprises square tubing comprising a channel and a longitudinal slot. The power track channel and power track slot extend along the length of the power track. The free track comprises square tubing comprising a channel and upper and lower longitudinal slots. The free track channel and upper and lower longitudinal slots extend along the length of the free track.

A chain is positioned within the power track channel. A motor drives the chain. Driver dogs, sometimes called pusher dogs, extend from the chain through the power track slot. Conventional power and free conveyors comprise trolleys. The trolleys comprise wheels, and in some cases flippers and ramps. Wheels of the trolleys are positioned within the free track channel. In a standard (non-inverted) power and free conveyor, the flippers, when in an engaged position, extend through the upper slot of the free track. A vertical load bar extends from a trolley main body. When engaged with the flipper, the trolleys are moved along the free track by the driver dogs.

Typically, front and rear trolleys are coupled together with a horizontal load bar connected to the vertical load bar. The front trolleys comprise flippers and the rear trolleys comprise a ramp. The horizontal load bar helps separate loads and permits greater carrying capacity because the weight of the load is distributed between the trolleys coupled to the horizontal load bar.

When multiple trolleys are coupled with a horizontal load bar, the driver dog engages the flippers of the front trolley. When the flippers of the front trolley encounter a ramp of an adjacent rear trolley or a stop, the flippers are moved to a flat position causing the driver dog to disengage from the flipper. With the driver dog disengaged from the flipper, the trolley is no longer driven by the driver dog and the trolley stops moving.

The chain of power and free conveyors requires maintenance and adjustment. For example, after many hours of service, constant loads on the chain can cause the chain to become deformed and/or stretch. A stretched chain causes slack. A power and free conveyor with a stretched chain becomes inefficient and if left unchecked, inoperable. As the chain is positioned within the power track, servicing or replacement of the chain of conventional power and chain conveyor requires that the power track be, at least partially, disassembled.

What is needed is a power and free conveyor system that permits easy servicing and replacement of the chain.

SUMMARY OF THE INVENTION

The power and free conveyor system of the preferred embodiment comprises a power track, a free track, a chain, a motor, a telescopic assembly, and a plurality of connectors. The power track and free track are coupled together with the connectors which, in the preferred embodiments are horseshoe shaped. The power track comprises square tubing comprising a channel and a longitudinal slot. The power track channel and power track slot extend along the length of the power track. The free track comprises left and right elongated U shape member defining a free track channel and upper and lower longitudinal slots. The free track upper and lower longitudinal slots extend along the length of the free track.

The chain is positioned within the power track channel. The motor drives the chain. Driver dogs extend from the chain through the power track slot. The free track is adapted to receive conventional and commercially available trolleys comprising wheels, and in some cases flippers and ramps. The wheels of the trolleys are positioned within the free track channel. The flippers (not shown), in a standard (non-inverted) power and free conveyor when in an engaged position, extend through the upper slot of the free track. A vertical load bar extends from a trolley main body. When engaged with the flipper, the trolleys are moved along the free track by the driver dogs.

Front and rear trolleys are coupled together with a horizontal load bar connected to the vertical load bars. In preferred embodiments, the front trolley comprises flippers and the rear trolley comprise a ramp (not shown).

When multiple trolleys are coupled with a horizontal load bar, the driver dog engages the flippers of the front trolley. When the flippers of the front trolley encounter a ramp of an adjacent rear trolley or a stop, the flippers are moved to a flat position causing the driver dog to disengage from the flipper. With the driver dog disengaged from the flipper, the trolley is no longer driven by the driver dog and the trolley stops moving.

The telescopic assembly of the preferred embodiment comprises a track member comprising a main body portion, a flange, a proximal end, and a distal end. The track member comprises square tubing comprising a channel and a longitudinal slot. In the preferred embodiments, the track member comprises a matching, but slightly smaller outside configuration than an inside configuration of a receiver portion and a connection portion of the power track. Thus, the track member is adapted to be inserted telescopically within the receiving portion of the power track. Otherwise, the track member has dimensions corresponding to other portions of the power track.

The flange extends from a side and top perimeter (in standard, non-inverted power and free conveyors) of the main body portion proximate to the distal end. In the preferred embodiment, the flange comprises through openings axially aligned with corresponding through openings in connectors so that flange can be coupled to connectors with conventional and commercially available fasteners. The distal end of track member extends distally slightly from flange such that the distal end is adapted to be inserted within the power track channel when the flange is coupled to a rear connector.

The main body portion proximal to the flange is fully inserted into receiving portion of power track when flange is coupled to a front connector. When the distal end of track member is moved proximally towards the front connector to a position away from the rear connector, the chain is exposed. In this position, a service person can readily access the chain. The service person, for example, can take the chain apart and remove one or more links. Alternatively, the service person can take the chain apart and replace the entire chain. When the work is complete, the service person unbolts the flange from the front connector, moves the track member towards the rear connector, and bolts the flange to the rear connector.

When track member is inserted, the longitudinal slot of track member aligns with the power track slot. Thus, when coupled in a working condition, the track member permits the system to be operated without interference with the chain.

Although the telescopic assembly of the preferred embodiment telescopes within the power track channel, relative movement can be obtained in other ways. For example, in other embodiments, the power track comprises an outside configuration that is smaller than an inside configuration of the track member channel such that the power track can be inserted within the track member channel. In such configuration, the track member can also be moved to expose the chain.

A method of servicing a chain of a power and free conveyor is also provided. The method comprises the steps of providing a power and free conveyor comprising a chain and a telescopic assembly comprising a telescopic track member, moving a distal end of the track member proximally towards a front connector to a position away from a rear connector; exposing the chain between the front and rear connectors; accessing the chain; servicing the chain; moving the track member towards the rear connector.

In other embodiments of the method, the telescopic track member comprises a flange and the steps include, before the step of moving a distal end of the track member proximally towards a front connector to a position away from a rear connector, the step of unfastening the flange from the rear connector and, after the step of moving the track member towards the rear connector, the step of fastening the flange to the rear connector.

DESCRIPTION OF THE PREFERRED EMBODIMENT

Figure 1:
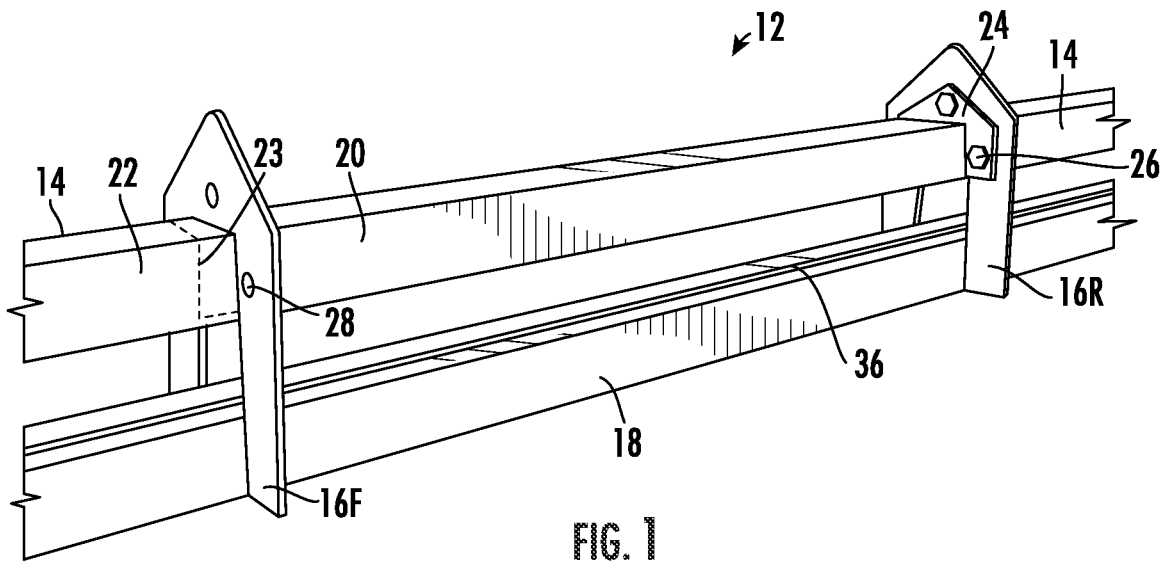
FIG. 1 is an isometric top, right and front view of the power and chain conveyor system with the telescopic portion of the power track coupled to the rearward section of power track, in accordance with a preferred embodiment.

Referring to the figures, there is shown the power and free conveyor system 10 comprising a telescopic assembly 12 in accordance with preferred embodiments. As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment of the present disclosure. Thus, the appearances of such phrases in various places throughout this specification are not necessarily all referring to the same embodiment. Furthermore, the particular features, structures, or characteristics may be combined in any suitable manner on one or more embodiments without limitation. The detailed description illustrates by way of example, not by way of limitation, the principles of the invention. This description will clearly enable one skilled in the art to make and use the invention, and describes several embodiments, adaptations, variations, alternatives, and uses of the invention, including what is presently believed to be the best mode of carrying out the invention.

Referring to the figures, the power and free conveyor system 10 of the preferred embodiment comprises a power track 14, a free track 18, a chain 40, a motor 42, a telescopic assembly 12, and a plurality of connectors 16. The embodiments shown in the present disclosure generally apply equally to a standard, non-inverted, power and free conveyor and an inverted power and free conveyor. In the attached drawings, the power and free conveyor 10 depicted is standard, wherein the upper track is the power track 14 and the lower track is the free track 18. However, the principles of the present invention are intended to apply to an inverted power and free conveyor 10 wherein the power track 14 is the lower track and the free track 18 is the upper track.

The power track 14 and free track 18 are coupled together with the connectors 16 which, in the preferred embodiments are horseshoe shaped. The power track 14 comprises square tubing comprising a channel 54 and a longitudinal slot 30. The power track channel 54 and power track slot 30 extend along the length of the power track 14. The free track 18 comprises left and right elongated U shape members 18L, 18R defining a free track channel 56 and upper and lower longitudinal slots 36, 38. The free track upper and lower longitudinal slots 36, 38 extend along the length of the free track 18.

The chain 40 is positioned within the power track channel 54. The motor 42 drives the chain 40. Driver dogs 52 extend from the chain 40 through the power track slot 30. The free track 18 is adapted to receive conventional and commercially available trolleys 48 comprising wheels 50, and in some cases flippers and ramps. The wheels 50 of the trolleys 48 are positioned within the free track channel 56. The flippers (not shown), when in an engaged position, extend through the upper slot 36 of the lower track 18. A vertical load bar 44 extends downward from a trolley main body 58. When engaged with the flipper, the trolleys 48 are moved along the lower track 18 by the driver dogs 52.

Front and rear trolleys 48F, 48R, are coupled together with a horizontal load bar 46 connected to the vertical load bars 44, 44. In preferred embodiments, the front trolley 48F comprises flippers and the rear trolley 48R comprise a ramp (not shown).

When multiple trolleys 48 are coupled with a horizontal load bar 46, the driver dog 52 engages the flippers of the front trolley 48F. When the flippers of the front trolley 48F encounter a ramp of an adjacent rear trolley 48R or a stop, the flippers are moved to a flat position causing the driver dog 52 to disengage from the flipper. With the driver dog 52 disengaged from the flipper, the trolley 48 is no longer driven by the driver dog 52 and the trolley 48 stops moving.

Referring to FIGS. 1-5, the telescopic assembly 12 of the preferred embodiment comprises a track member 20 comprising a main body portion 21, a flange 24, a proximal end 23, and a distal end 32. The track member 20 comprises square tubing comprising a channel 60 and a lower longitudinal slot 62. In the preferred embodiments, the track member 20 comprises a matching, but slightly smaller outside configuration than an inside configuration of receiving and connection portions 22, 57 of the power track 14. Thus, the track member 20 is adapted to be inserted telescopically within the receiving portion 22 of power track 14 as shown, for example, in FIG. 3. The flange 24 extends from a side and top perimeter of the main body portion 21 proximate to the distal end 32. In the preferred embodiment, the flange 24 comprises through opening 28 axially aligned with corresponding through openings 28 in connectors 16F, 16R so that flange 28 can be coupled to connectors 16F, 16R with conventional and commercially available fasteners 26, 34. In the preferred embodiment, fasteners 26, 34 comprise a hex head bolt 26 and a nut 34. As shown in FIG. 1, the distal end 32 of track member 20 extends distally slightly from flange 28 such that the distal end 32 is adapted to be inserted within the connection portion 57 of the power track member channel 54 when flange 28 is coupled to a rear connector 16R.

Figure 4:
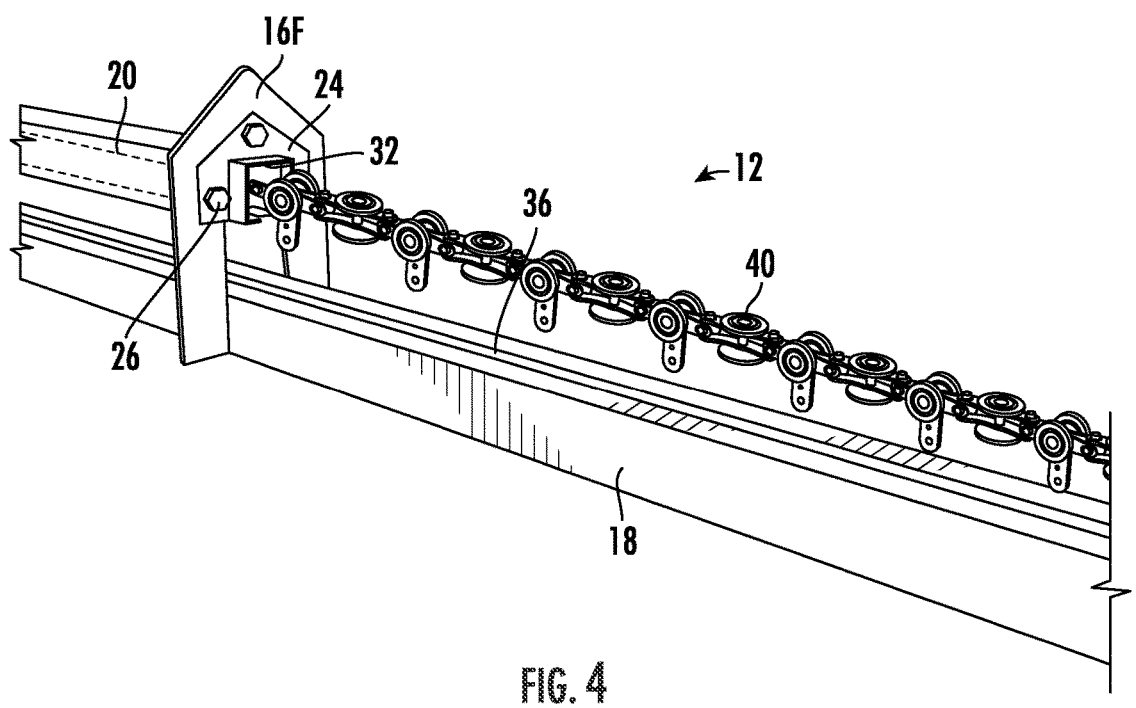
FIG. 4 is an isometric top, right and rear view of the power and chain conveyor of the power and chain conveyor system of FIG. 1 with the telescopic portion of the power track fully inserted within the forward section of power track.
Figure 5:
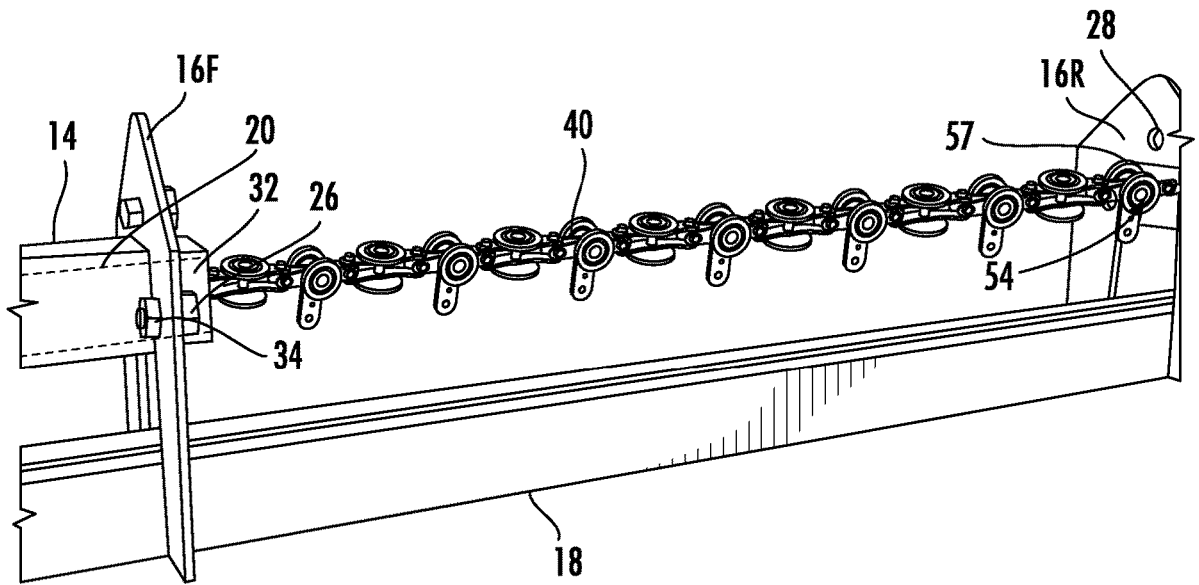
FIG. 5 is an isometric top, right and front view of the power and chain conveyor system of FIG. 4.
Figure 6:
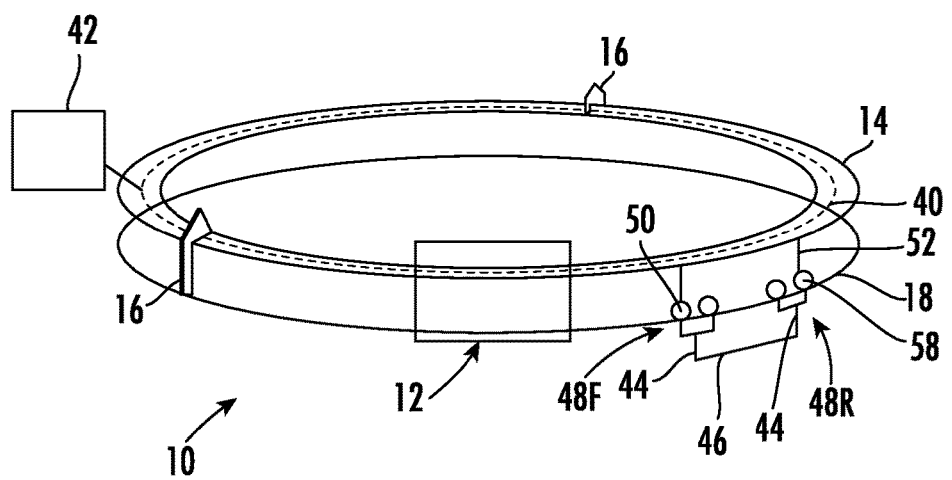
FIG. 6 is a conceptual diagram depicting the system, in accordance with a preferred embodiment.

The main body 21 portion proximal to the flange 28 is fully inserted into receiving portion 22 of power track 14 when flange 28 is coupled to a front connector 16F, as shown, for example, in FIG. 4. When the distal end 32 of track member 20 is moved proximally towards the front connector 16F to a position away from the rear connector 16R, the chain 40 is exposed, as shown, for example, in FIGS. 4 & 5. In this position, a service person can readily access the chain 40. The service person, for example, can take the chain 40 apart and remove one or more links. Alternatively, the service person can take the chain 40 apart and replace the entire chain. When the work is complete, the service person unbolts the flange 24 from the front connector 16F, moves the track member 20 towards the rear connector 16R, and bolts the flange 24 to the rear connector 16R.

Figure 2:
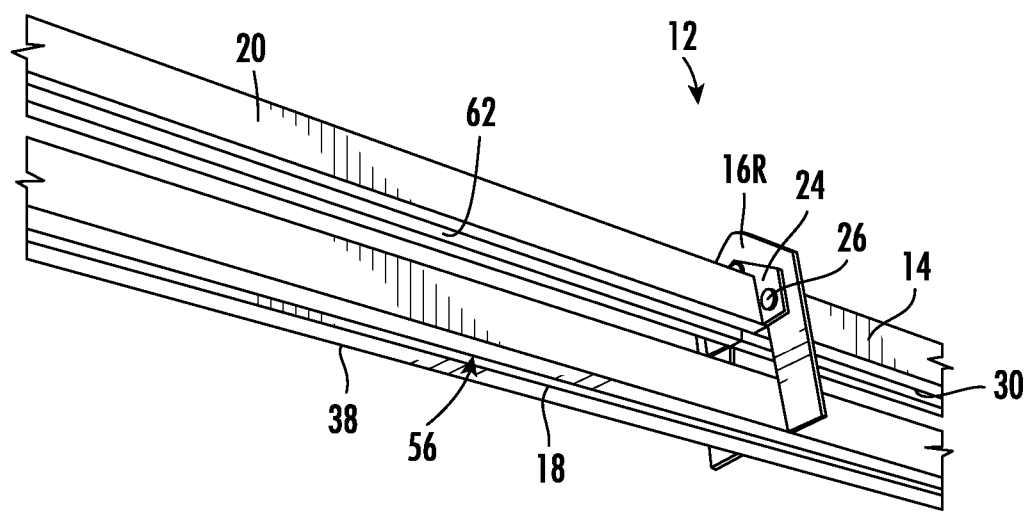
FIG. 2 is an isometric bottom, right and front view of the power and chain conveyor system of FIG. 1.
Figure 3:
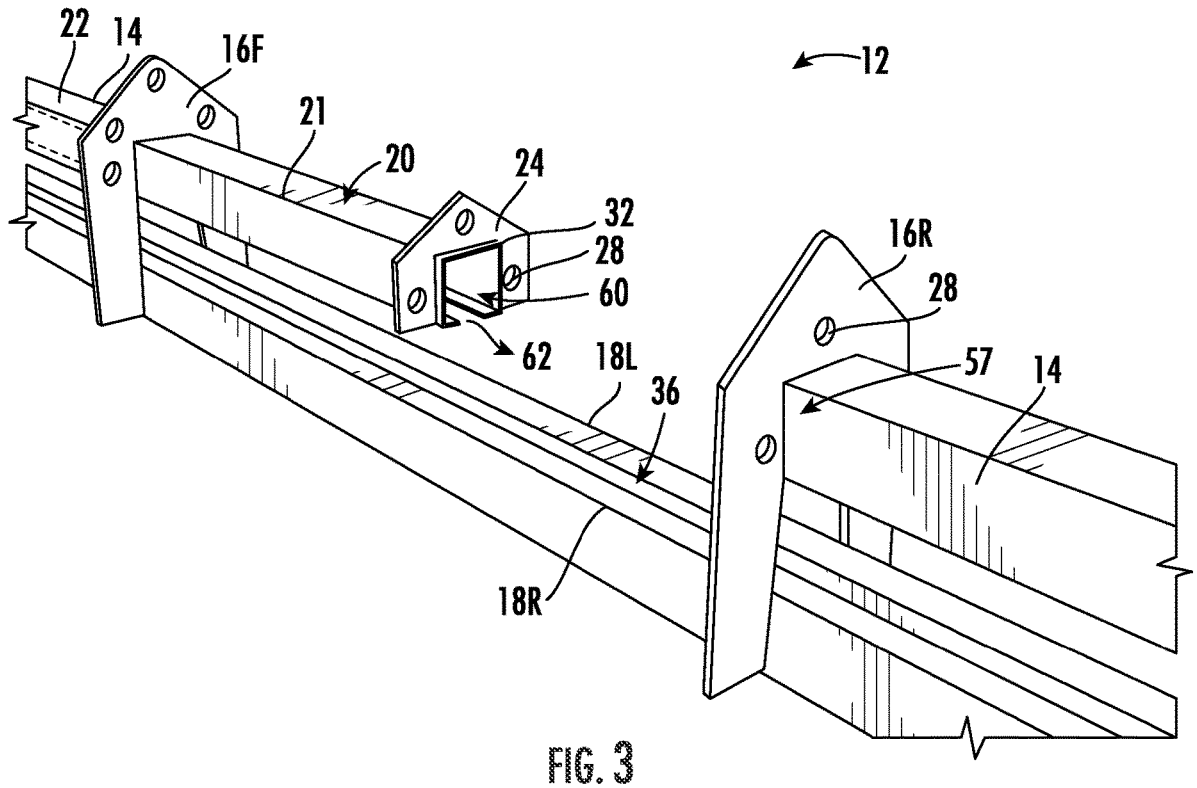
FIG. 3 is an isometric top, right and rear view of the power and chain conveyor of the power and chain conveyor system of FIG. 1 with the telescopic portion of the power track partially inserted within the forward section of power track.

When track member 20 is inserted the lower longitudinal slot 62 of track member aligns with the power track slot 30. Thus, when coupled in a working condition as shown in FIGS. 1 & 2, the track member 20 permits the system 10 to be operated without interference with the chain 40.

In the preferred embodiment, components of the system 10 are formed from powder coated steel. The telescopic assembly 12 comprises steel. The track member 20 comprises a smooth exterior to permit the track member 20 to be easily moved within the power receiving and connection portions 22, 57 of the power track channel 54. However, the system 10 and the telescopic assembly 12 may be formed from other suitable materials. The components of certain embodiments comprise other natural or man-made suitable materials, such as metals, or materials formed from a variety of polymers, monomers, co-polymers, polyethylene, polypropylene, polyvinyl chloride, polytetrafluoroethylene (PTFE) or other suitable synthetic material, without departing from the scope and spirit of this disclosure.

Moreover, although the telescopic assembly 12 of the preferred embodiment telescopes within the power track channel 54 relative movement can be obtained in other ways. For example, in other embodiments, the power track 14 comprises an outside configuration that is smaller than an inside configuration of the track member channel 60 such that the power track can be inserted within the track member channel 60. In such configuration, the track member 20 can also be moved to expose the chain 40.

A method of servicing a chain 40 of a power and free conveyor is also provided. The method comprises the steps of providing a power and free conveyor comprising a chain and a telescopic assembly 12 comprising a telescopic track member 20; moving a distal end 32 of the track member 20 proximally towards a front connector 16F to a position away from a rear connector 16R; exposing the chain between the front and rear connectors 16F,16R; accessing the chain; servicing the chain 40; moving the track member 20 towards the rear connector 16R.

In embodiments of the method, the telescopic track member 20 comprises a flange 24 and the steps include, before the step of moving a distal end 32 of the track member 20 proximally towards a front connector 16F to a position away from a rear connector 16R, the step of unfastening the flange 24 from the rear connector 16R and, after the step of moving the track member 20 towards the rear connector 16R, the step of fastening the flange 24 to the rear connector 16R.

In other embodiments of the method, the method comprises the steps of providing a power and free conveyor 10 comprising a power track 14, a free track 18, a chain 40; the power track 20 comprising the chain 40, a front connector 16F, a rear connector 16R, and a sliding assembly 12, the sliding assembly 12 comprising a track member 20; moving a distal end 32 of the track member 20 proximally towards the front connector 16F to a position away from the rear connector 16R such that a gap is created between the front connector and the track member 20 distal end 32 and such that the chain 40 is exposed; and accessing the chain 40; servicing the chain 40; and moving the track member 20 towards the rear connector 16R.

In other embodiments of the method, the track member 20 comprises a flange 24 and, before the step of moving a distal end 32 of the track member 20 proximally towards the front connector 16F to a position away from the rear connector 16R such that a gap is created between the front connector 16F and the track member distal end 32 and such that the chain 40 is exposed, the step of unfastening the flange 24 from the rear connector 16R; and after the step of moving the track member 20 towards the rear connector 16R, the step of fastening the flange 24 to the rear connector 16R.

In other embodiments of the method, the power track 14 comprises a receiver portion 22, and a track member proximal end 23 is slidingly and telescopically arranged within the receiver portion 22.

In other embodiments of the method, one or both of the front and rear connectors 16F,16R comprise a U configuration.

In other embodiments of the method, the receiver portion 22 comprises a rear connector 16R and the flange 24 is adapted to be coupled to the rear connector 16R when the track member 20 is in the second position.

In other embodiments of the method, the step of servicing the chain 40 includes the sub-step of removing one or more links from the chain 40.

In other embodiments of the method, the step of servicing the chain 40 includes the sub-steps of removing the chain 40 and replacing the chain 40.

While there has been illustrated and described what is, at present, considered to be a preferred embodiment of the present invention, it will be understood by those skilled in the art that various changes and modifications may be made, and equivalents may be substituted for elements thereof without departing from the true scope of the invention. Therefore, it is intended that this invention not be limited to the particular embodiment disclosed as the best mode contemplated for carrying out the invention, but that the invention will include all embodiments falling within the scope of this disclosure.

I claim:

1. An assembly adapted for use in a power and free conveyor, the assembly comprising:
    a track member comprising a main body portion, a flange, a proximal end, and a distal end;
    the track member being adapted to be joined with a power track of a power and free conveyor, the power track comprising a receiver portion and a connection portion;
    the track member comprising a channel and a longitudinal slot;
    the channel being adapted to retain a chain;
    the longitudinal slot being adapted to permit a pusher dog coupled to the chain to be extended through the longitudinal slot;
    the track member being adapted to be slidingly received by the receiver portion of the power track of the power and free conveyor;
    the flange extending from a side and top perimeter of the main body portion proximate to the distal end;
    the flange being structured and arranged to be removably coupled to the power track connection portion; and
    the track member being slidingly moveable from a first position to a second position such that, when in the first position, the proximal end is retained within the receiver portion and the distal end is coupled to the connection portion, and when in the second position, the proximal end is retained within the receiver portion and there is a gap between the distal end and the connection portion.

2. The assembly of claim 1, the power track comprising a power track channel, the track member proximal end being adapted to be inserted within the power track channel.

3. The assembly of claim 1, the connection portion comprising a connector, the flange being adapted to be coupled to the connector.

4. The assembly of claim 3, the connector comprising a U configuration.

5. The assembly of claim 2, the receiver portion comprising a receiver connector, the flange being adapted to be coupled to the receiver connector when the track member is in the second position.

6. The assembly of claim 5, the distal end of track member extending distally from the flange such that the distal end is adapted to be inserted within the power track channel when the flange is coupled to the receiver connector.

7. A power and free conveyor comprising;
    a power track comprising a sliding portion, a receiver portion, and a connection portion;
    a free track, a chain, a motor, and a plurality of connectors;
    the power track and free track being coupled together with the connectors;
    the power track comprising a channel and a longitudinal slot;
    the power track channel being adapted to retain the chain;
    the longitudinal slot being adapted to permit a pusher dog coupled to the chain to be extended through the power track longitudinal slot;
    the power track channel and power track slot extending along a length of the power track;
    the free track comprising a free track channel and upper and lower longitudinal slots;
    the free track upper and lower longitudinal slots extending along a length of the free track;
    the sliding portion comprising a track member comprising a main body portion, a flange, a proximal end, and a distal end;
    the track member being adapted to be slidingly received by the receiver portion of the power track of the power and free conveyor;
    the flange extending from a side and top perimeter of the main body portion proximate to the distal end;
    the flange being structured and arranged to be removably coupled to the power track connection portion; and
    the track member being slidingly moveable from a first position to a second position such that, when in the first position, the proximal end is retained within the receiver portion and the distal end is proximate to the connection portion, and when in the second position, the proximal end is retained within the receiver portion and there is a gap between the distal end and the connection portion.

8. The power and free conveyor of claim 7, the track member proximal end being adapted to be inserted within the power track channel.

9. The power and free conveyor of claim 7, the connection portion comprising a connector, the flange being adapted to be coupled to the connector.

10. The power and free conveyor of claim 9, the connector comprising a U configuration.

11. The power and free conveyor of claim 10, the distal end of track member extending distally from the flange such that the distal end is inserted within the power member channel when the flange is coupled to the connector.

12. The power and free conveyor of claim 6, the receiver portion comprising a receiver connector, the flange being adapted to be coupled to the receiver connector when the track member is in the second position.

* * * * *